United States Patent [19]
Madsen

[11] Patent Number: 5,744,925
[45] Date of Patent: Apr. 28, 1998

[54] CONTROL METHOD AND APPARATUS FOR TWO-WIRE MOTOR ACTUATOR

[75] Inventor: Wayne Alan Madsen, Kokomo, Ind.

[73] Assignee: Delco Electronics Corporation, Kokomo, Ind.

[21] Appl. No.: 715,282

[22] Filed: Sep. 16, 1996

[51] Int. Cl.$^6$ ................... G05B 1/03; B60H 1/24
[52] U.S. Cl. ............ 318/590; 318/565; 318/626; 318/264; 318/295; 318/468
[58] Field of Search ............... 318/565, 590, 318/626, 650, 652, 663, 671, 256, 264, 265, 266, 286, 293, 295, 466, 468

[56] References Cited

U.S. PATENT DOCUMENTS

| | | | |
|---|---|---|---|
| 3,979,654 | 9/1976 | Guicheteau et al. | 318/599 |
| 4,017,832 | 4/1977 | Gilbert | 318/266 X |
| 4,767,974 | 8/1988 | Kadosawa | 318/663 |
| 4,866,355 | 9/1989 | The | 318/282 |
| 5,132,602 | 7/1992 | Jorgensen et al. | 313/608 |
| 5,153,493 | 10/1992 | Jornod et al. | 318/609 |
| 5,574,343 | 11/1996 | Leiber et al. | 318/291 |
| 5,606,236 | 2/1997 | Tennies et al. | 318/626 |

*Primary Examiner*—Bentsu Ro
*Attorney, Agent, or Firm*—Jimmy L. Funke

[57] ABSTRACT

An actuator for automotive HVAC control is coupled to a remote controller by two wires. The controller applies power to the actuator in a high current or a low current mode. A variable resistance driven by the actuator generates a voltage proportional to position in the low current mode. Zener diodes in the actuator circuit prevent motor operation in the low current mode and permit motor operation in the high current mode. A microprocessor in the controller selects the mode and reads the voltage in low mode to determine position. It controls the motor for a duration required to reach a desired position and then checks the new position to verify that the target has been reached. If not, another iteration is employed to reach the target.

10 Claims, 3 Drawing Sheets

5,744,925

1

CONTROL METHOD AND APPARATUS FOR TWO-WIRE MOTOR ACTUATOR

FIELD OF THE INVENTION

This invention relates to a motor actuator having a remote controller connected by two wires and particularly to a position feedback method and apparatus for operating such an actuator.

BACKGROUND OF THE INVENTION

It is becoming commonplace, for example in motor vehicles, to actuate a device on the vehicle by a microprocessor-based controller at a location remote from the motor actuator. One application is in controls for heating, ventilation and air conditioning. This system uses several doors in the system ducts for controlling air flow and regulating temperature. Each door has an actuator which is remotely controlled by a controller on the instrument panel. Only two wires are needed to supply current for motor operation in either forward or reverse direction, but to ensure that the motor moves the actuator output to the desired position a potentiometer driven by the actuator can provide position feedback. That approach typically requires up to three additional control wires. The expense and space requirements for so many wires to several different actuators is not acceptable.

It is already known to achieve position control of a remote actuator using only the two power wires. This is done by a circuit which detects commutation pulses and senses motor stall when the actuator is moved to a known limit position. The stall condition is indicated by a long interval between pulses, say, 250 msec. From the limit position the circuit counts voltage pulses associated with commutator rotation, thereby keeping track of the motor movement in either direction to establish actuator position. The position is retained in memory when the vehicle ignition is turned off, but long term drift occurs due to the inability of the system to always detect the first or last commutation of the motor. Thus it is necessary to occasionally move the actuator to the limit position for calibration. The position record is also subject to loss in the event of electromagnetic interference. It is desirable to accomplish the position control with a simpler circuit using only the two power wires.

SUMMARY OF THE INVENTION

It is therefore an object of the invention to minimize wire connections between an actuator and its controller while affording an absolute measure of actuator position. It is another object in such a system to have immunity against loss of position data due to electromagnetic interference. Another object is to simplify the circuit for two wire actuator systems.

BRIEF DESCRIPTION OF THE DRAWINGS

The above and other advantages of the invention will become more apparent from the following description taken in conjunction with the accompanying drawings wherein like references refer to like parts and wherein.

DESCRIPTION OF THE INVENTION

Figure 1:
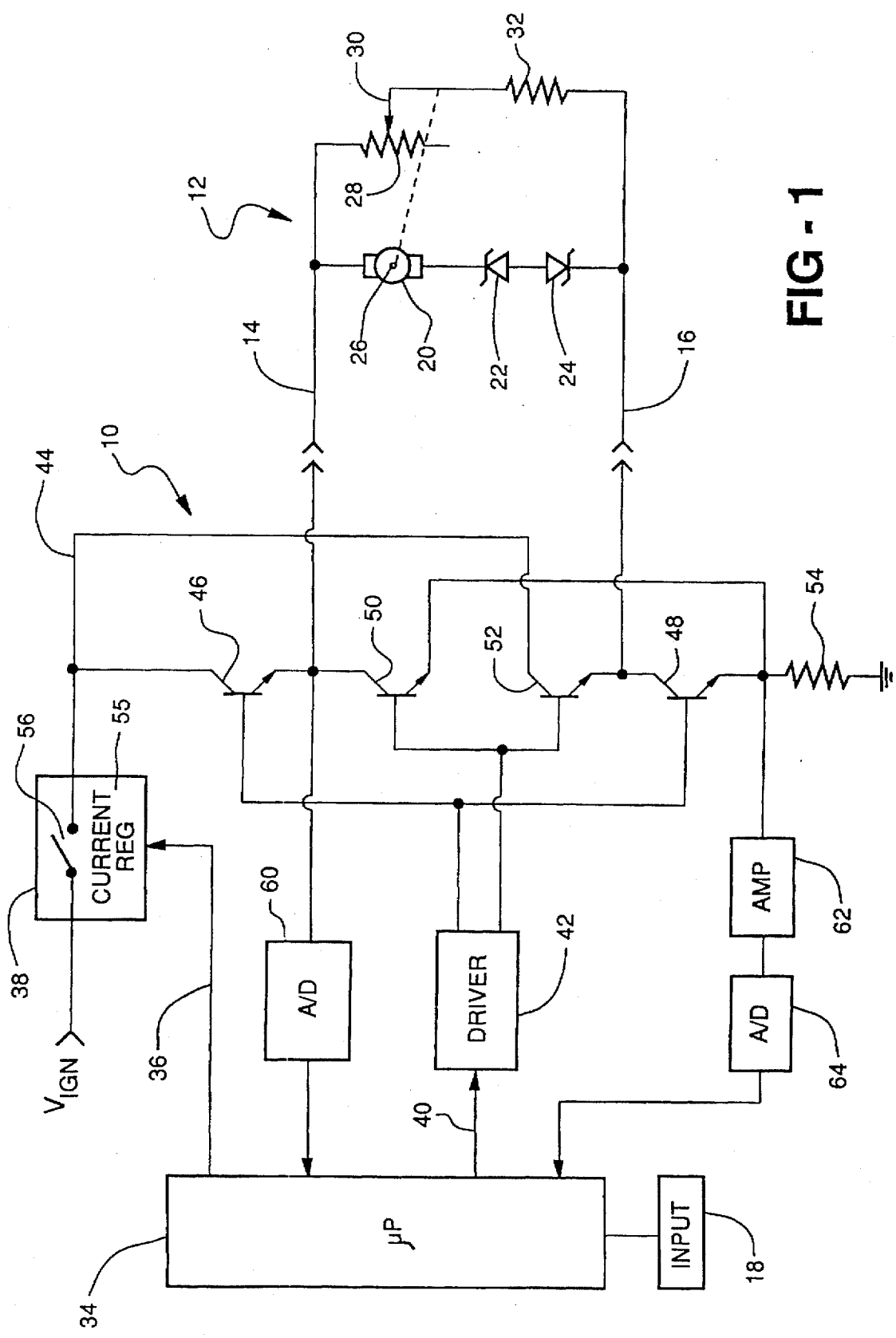
FIG. 1 is a schematic diagram of an actuator system according to the invention.

Referring to FIG. 1, an actuator system comprises a controller 10 connected to an actuator 12 by two wires 14 and 16. The controller 10 is supplied by vehicle ignition voltage $V_{IGN}$ and receives position commands from an input 18 which may be a manually operated knob or push button, for example, or may be on output of an automatic control. The controller energizes the wires 14, 16 to operate the actuator 12, the polarity of the wires determining actuator direction.

The actuator 12 comprises a DC motor 20 and a pair of back-to-back Zener diodes 22 and 24 serially connected across the two wires 14, 16. The effect of the Zener diodes is to prevent current flow in the motor unless the voltage on the wires is greater than a threshold defined by the breakdown voltage of one diode, which may be 5.1v for example, plus the forward bias drop of the other diode. The motor 20 may include a gear train so that the shaft 26 which is the actuator output element will rotate much slower than the motor armature.

A variable resistance in the form of a rheostat comprises a first resistor 28 having a sliding tap 30 and a fixed resistor 32 in series with the tap. The tap position is controlled by the actuator output shaft 26 so that the resistance value is directly related to the actuator position. The total resistance range may be 1K to 11K, for example. When a fixed known current is applied to the variable resistance a voltage representing actuator position will be produced. By selecting a fixed current value low enough that the maximum voltage is less than the conduction threshold of the Zener diodes, the position voltage will be developed without causing motor operation.

The controller 10 is based on a microprocessor 34 which receives the commands from the input 18 and issues control signals on line 36 to a current selector 38 and on line 40 to a driver 42. The selector 38 applies power to line 44, and transistors 46–52 in a H-switch configuration connect the wires 14 and 16 to line 44 and to ground through a small current sense resistor 54, which is optional for detecting stall. Transistor 46 is coupled between line 44 and wire 14 and transistor 48 is coupled between wire 16 and resistor 54 which is substantially ground voltage. These transistors 46, 48 are activated by a line from the driver 42 to apply high voltage to wire 14 and ground voltage to wire 16 to cause motor operation in one direction if the voltage is higher than the threshold. Transistor 50 is coupled between wire 14 and resistor 54 and transistor 52 is connected between line 44 and wire 16. These transistors 50, 52 are activated by another line from the driver 42 to apply high voltage to wire 16 and substantially ground voltage to wire 14 to cause motor operation in the other direction if the voltage is higher than the threshold. If none of the transistors are activated the motor will remain stationary.

The current selector 38 has two current modes selected by the signal on line 36. A high current mode is effected by closing a switch 56 which applies $V_{IGN}$ to the line 44 and through either set of transistor switches to the wires 14, 16. This voltage will far exceed the threshold for any value of the variable resistance to cause motor operation. A low current mode is effected by actuating a regulated current source 55 which supplies a fixed current which is too small to produce an actuator voltage greater than the threshold voltage. In this case the motor will not run and a voltage representing actuator position will be generated on line 14. This voltage is digitized by an A/D converter 60 and coupled to a microprocessor port. Thus the microprocessor can always determine the actuator position by selecting the low current mode and reading the voltage produced at the actuator. Also the microprocessor can operate the motor by selecting the high current mode as well as selecting a driver output for the desired motor direction.

The voltage developed on the optional stall sense resistor 54 is small but becomes larger when stall occurs. An amplifier 62 and an A/D converter 64 transmit the voltage value to the microprocessor which uses the data to detect stall. Stall can also be detected by monitoring commutation pulses.

Figure 2:
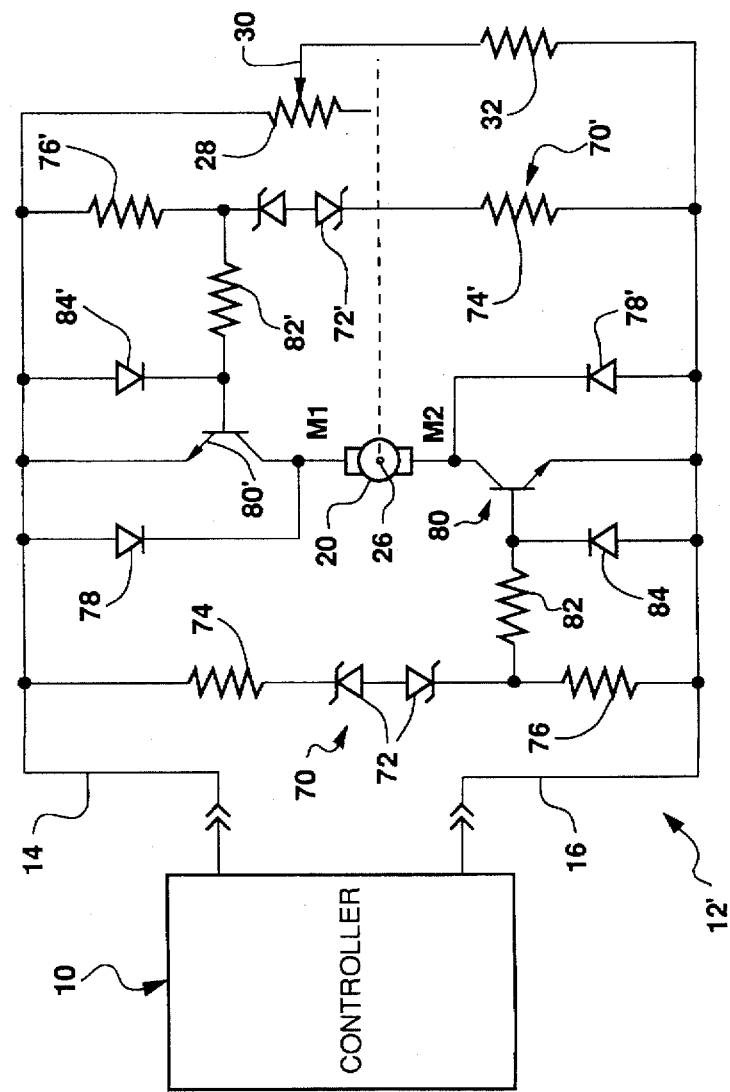
FIG. 2 is a schematic diagram of an actuator system according to another embodiment of the invention.

The Zener diode voltage drops in the circuit of FIG. 1 diminish the voltage across the motor 20. In applications where a larger voltage on the motor is desired the embodiment of FIG. 2 is useful. The controller circuit 10 is the same as that of FIG. 1. The actuator 12' however removes the Zener diodes from series circuit with the motor 20. The variable resistance using resistors 28 and 32 is the same as in FIG. 1 and is driven by the output shaft 26. A first voltage sensitive motor control circuit 70 for selectively permitting motor operation in one direction includes a back-to-back pair of Zener diodes 72 in series with a resistor 74 and a resistor 76 coupled across the wires 14 and 16. A diode 78 is connected from the wire 14 to the motor 20 and a transistor 80 is connected from the motor to wire 16. The junction of the anode of Zener diode 72 and the resistor 76 is connected through a resistor 82 to the base of the transistor 80. A diode 84 is connected from the transistor 80 base to wire 16 with the anode at wire 16 to protect against reverse bias of the transistor. The actuator also contains a complementary second voltage sensitive control circuit 70' containing elements 72' to 84' for selectively permitting motor operation in the other direction.

When power is applied in the low current mode to wires 14 and 16 with wire 14 positive, both Zener diode pairs are nonconductive keeping both transistors 80 and 80' turned off. Then, as in the previous embodiment, a voltage representing actuator position will be developed across wires 14 and 16. In the high current mode, both pairs of Zener diodes will conduct. If wire 14 is positive, transistor 80 will be turned on and motor current will flow through diode 78 and transistor 80. Note that the full voltage across the wires will be applied to the motor less the voltage dropped across diode 78 and transistor 80. The current flow through Zener pairs 72' will try to reverse bias the emitter junction of transistor 80', but diode 84' will inhibit this condition. Since diode 78 is conducting, the protection for transistor may not be necessary. With appropriate selection of resistors 74, 74', 76 and 76', the resistors 82 and 82' could be replaced by shorts and the diodes 84 and 84' be eliminated. For applied power of the reverse polarity, the operation will be similarly with motor rotation in the opposite direction.

Figure 3:
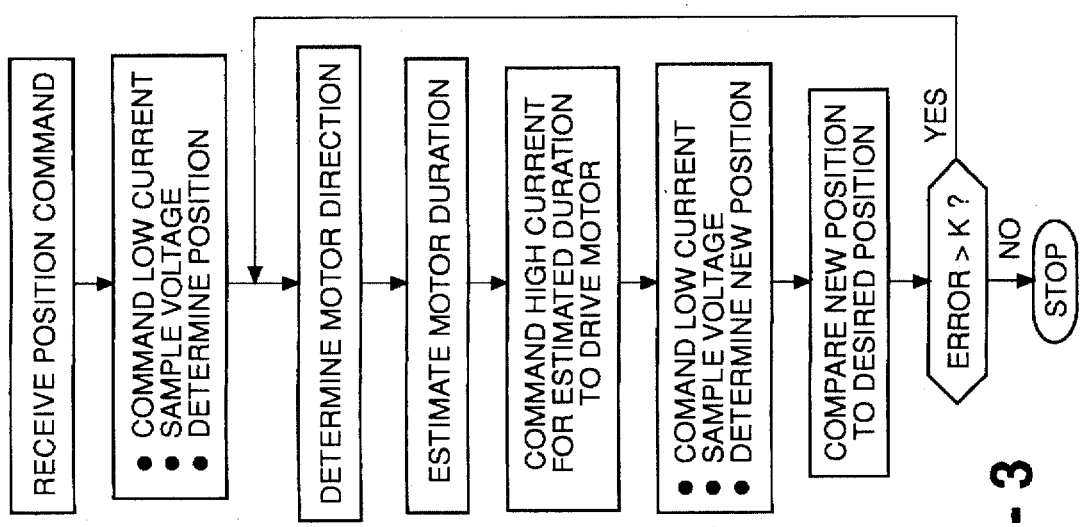
FIG. 3 is a flow chart illustrating the operation of the system.

In either embodiment, the motor runs in the high current mode and the position is measured in the low current mode. The microprocessor is programmed to carry out actuator positioning as shown in the flow chart of FIG. 3. When the microprocessor receives a position command the low current mode is entered, the resulting voltage is sampled and the actuator position is determined from the voltage. The voltage is proportional the actuator position with a constant offset due to the resistor 32. It is here assumed that the exact relationship of voltage to position has already been established by a calibration procedure and stored in the form of a look-up table or as parameters of an equation. Next, based on the difference of the current position and the commanded position, the required direction of rotation is determined and then, based on known motor speed, the required duration of motor operation to reach the desired position is calculated. Then the high current mode and the proper polarity are commanded for the estimated duration. The motor is stopped, the low current mode is entered, and the voltage is sampled to determine the new position. The new position is compared to the desired position and if the error is small the process is complete. If, however, the error is greater than a preset value K, the motor direction and estimated duration are again determined and the motor is driven again to approach the desired position. Two or three iterations should be sufficient to reach the desired position.

Figure 4:
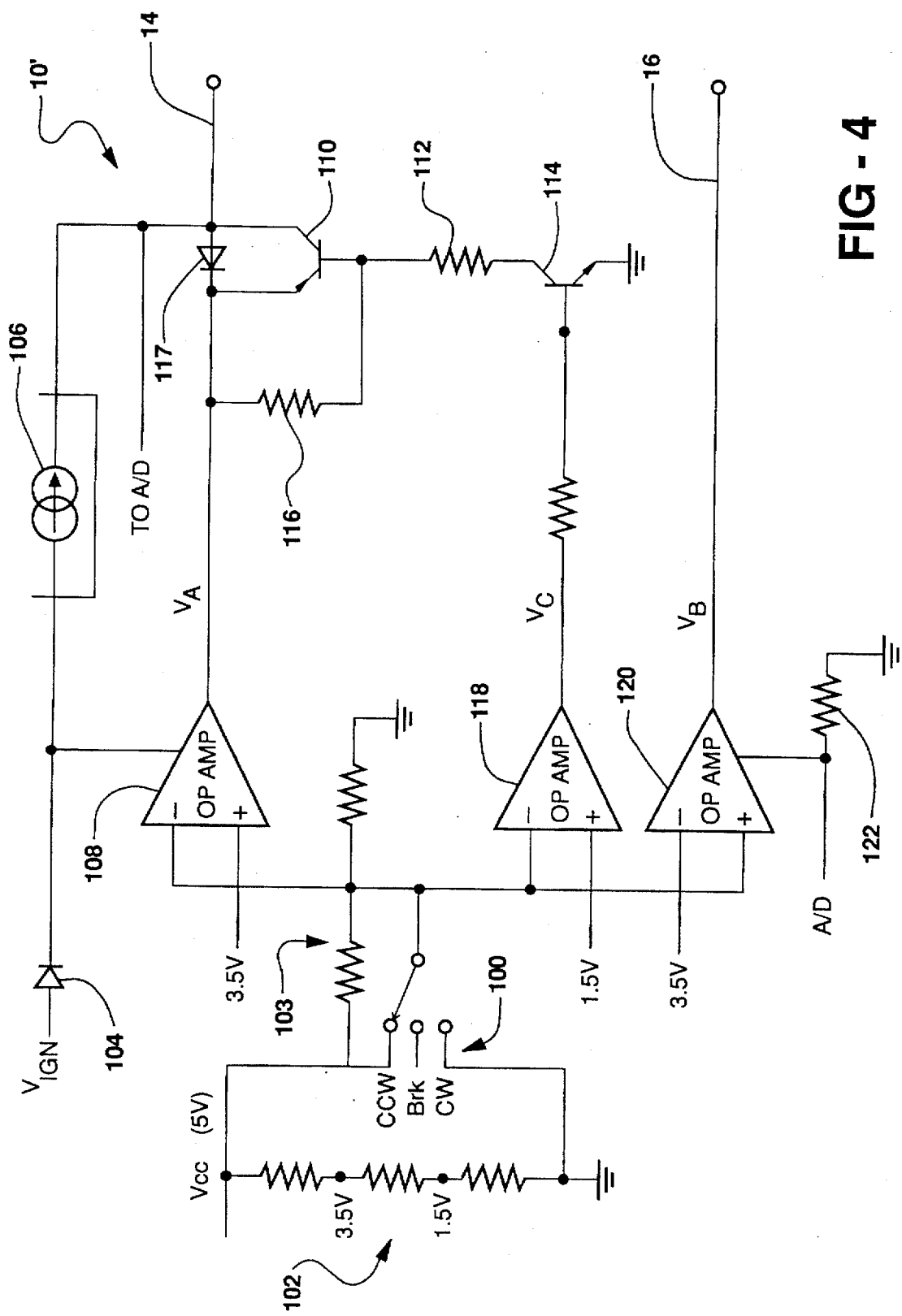
FIG. 4 is a schematic diagram of a control circuit which may replace that shown in FIG. 1.

Another implementation of the control circuit 10 is shown in FIG. 4 as circuit 10'. A three-way switch 100 has first and second contacts coupled to $V_{CC}$ (5v) and ground to provide CCW and CW motor control, respectively, and a third contact unconnected for BRK (brake or off) condition. The switch function is to produce a control voltage on the common switch contact and may be carried out by a microprocessor output, for example. A voltage divider 102 across $V_{CC}$ and ground develops reference voltages of 3.5v and 1.5v. A second voltage divider 103 applies a 2.5 volt control voltage to the common switch contact when it is otherwise unconnected. Ignition voltage $V_{IGN}$ is coupled through a diode 104 to a 0.5mA current source 106 to supply line 14. An operational amplifier 108 supplied by the ignition voltage has its positive input coupled to the 3.5v reference and its negative input coupled to the common switch contact. Its output, $V_A$, is coupled through a transistor 110 to line 14. The transistor base is selectively connected through a resistor 112 and a second transistor 114 to ground. A bias resistor 116 is coupled between the emitter and base of transistor 110 and a diode 117 is connected across the emitter and collector of transistor 110. The transistor 114 is controlled by the output $V_C$ of a second operational amplifier 118 which has its negative input coupled to the common switch contact and its negative contact coupled to the 1.5v reference. A third operational amplifier 120 has its negative input coupled to the 3.5v reference and its positive input coupled to the common switch contact. Its output $V_B$ comprises the line 16. An optional sense resistor 122 may be included in the ground line of the operational amplifier 120.

In operation, when the switch is set at the CCW position to apply 5v to the operational amplifiers, $V_A=0$, $V_B=1$ and $V_C=0$ so that the line 16 will carry ignition voltage and line 14 will be near ground for counterclockwise motor rotation. When the switch is set at the CW position to apply 0v to the operational amplifiers, $V_A=1$, $V_B=0$ and $V_C=1$ so that both transistors will be conducting, the line 14 will carry ignition voltage and line 16 will be near ground for clockwise motor rotation. In the case of the BRK switch setting 2.5v is applied to the operational amplifiers, $V_A=1$, $V_B=0$ and $V_C=0$ so that the transistors are off and the current source supplies line 14. The voltage developed on line 14 is submitted to a microprocessor via an A/D converter to determine the actuator position.

It will thus be seen that each embodiment of the invention provides a way of controlling remote actuators with only two wires connected to the controller and actuator. Further, the circuitry is simple and inexpensive. A fairly simple IC could control all the necessary functions.

The embodiments of the invention in which an exclusive property or privilege is claimed are defined as follows:

1. An apparatus comprising:
   an actuator including a DC motor for positioning an output element, the actuator having only two wires;
   a variable resistance in the actuator connected across the two wires and controlled by the output element over a resistance range to produce a resistance value dependent on the position of the output element;

a motor controller remote from the actuator and connected to the two wires for supplying current to the actuator and reading voltage developed across the actuator;

control means in the actuator responsive to the actuator voltage for applying driving current to the motor only for voltage above a threshold value to position the actuator, and for blocking current through the motor for voltage below the threshold value;

the controller having a current source for alternatively producing current in a first mode which yields actuator voltage above the threshold value over the variable resistance range, and producing current in a second mode which yields actuator voltage below the threshold value over the variable resistance range whereby in the second mode the voltage across the wires is dependent on the position of the output element;

and means in the controller responsive to the voltage across the wires during the second mode to determine the position of the output element.

2. The invention as defined in claim 1 wherein the control means in the actuator includes Zener diode means in series with the motor for blocking current in the motor for voltages below the threshold and passing motor current for voltages above the threshold.

3. The invention as defined in claim 1 wherein the control means in the actuator includes:

transistor means in series with the motor to selectively switch motor current on and off; and voltage sensing means across the two wires and coupled to the transistor means for controlling motor current switching according to the voltage.

4. The invention as defined in claim 3 wherein the voltage sensing means includes Zener diodes which establish the threshold and control the transistor means.

5. The invention as defined in claim 1 wherein a microprocessor in the controller is responsive to the voltage across the wires during the second mode to determine the position of the output element.

6. The invention as defined in claim 5 wherein;

the microprocessor is coupled to the current source to select the first and second modes; and driving circuitry under control of the microprocessor couples the current source to the two wires in accordance with desired motor direction.

7. The invention as defined in claim 5 wherein;

the microprocessor is programmed to estimate the time required to move the actuator to a desired position;

the microprocessor is coupled to the current source to command the first current mode for the estimated time and then command the second current mode for determining the position of the output element.

8. In an actuator apparatus having a controller connected by only two wires to a motor which drives an output element, the controller including a dual mode current source alternatively providing a high current for driving the motor and a low current for sensing position of the output element, the method of positioning the output element comprising the steps of:

during a low current mode inhibiting motor operation and producing a voltage across the wires as a function of the position of the output element;

determining the present initial position from the voltage;

receiving a desired position command;

estimating the duration of motor operation required to reach the desired position;

driving the motor by supplying high current for the estimated duration;

then supplying low current and determining the new position to verify the attainment of the desired position.

9. The invention as defined in claim 8 further including the steps of:

if the error between the desired position and the new position is greater than a set value, repeating the estimating, driving and supplying steps to iteratively progress toward the desired position.

10. The invention as defined in claim 8 wherein the high current produces a voltage across the wires above a threshold value and the low current produces a voltage below the threshold value, and wherein:

the step of driving the motor includes detecting the voltage above the threshold value and applying the voltage to the motor; and when low current is applied, detecting the voltage below the threshold and inhibiting motor current.

* * * * *